(12) United States Patent
Witkewitz et al.

(10) Patent No.: US 7,767,243 B2
(45) Date of Patent: Aug. 3, 2010

(54) COMBINATIONS OF COOLING AGENTS FOR USE IN CONFECTIONS

(75) Inventors: David L. Witkewitz, Bridgeview, IL (US); Gordon N. McGrew, Evanston, IL (US)

(73) Assignee: WH. Wrigley Jr. Company, Chicago, IL (US)

( * ) Notice: Subject to any disclaimer, the term of this patent is extended or adjusted under 35 U.S.C. 154(b) by 1258 days.

(21) Appl. No.: 11/316,610

(22) Filed: Dec. 22, 2005

(65) Prior Publication Data

US 2006/0159819 A1 Jul. 20, 2006

Related U.S. Application Data

(60) Provisional application No. 60/640,141, filed on Dec. 29, 2004.

(51) Int. Cl.
*A23L 1/22* (2006.01)
(52) U.S. Cl. ............... 426/534; 514/613; 424/48; 424/49
(58) Field of Classification Search ............... 424/49
See application file for complete search history.

(56) References Cited

U.S. PATENT DOCUMENTS

| | | | |
|---|---|---|---|
| 4,029,759 A | 6/1977 | Humbert et al. | |
| 4,136,163 A | 1/1979 | Watson et al. | |
| 4,911,937 A * | 3/1990 | Crosello et al. | ............ 426/103 |
| 5,009,893 A | 4/1991 | Cherukuri et al. | |
| 5,451,404 A | 9/1995 | Furman | |
| 5,663,460 A | 9/1997 | Yamamoto et al. | |
| 5,698,181 A | 12/1997 | Luo | |
| 5,725,865 A | 3/1998 | Mane et al. | |
| 6,306,429 B1 | 10/2001 | Bealin-Kelly | |
| 6,455,080 B1 | 9/2002 | Wolf et al. | |
| 6,627,233 B1 | 9/2003 | Wolf et al. | |
| 6,770,264 B2 | 8/2004 | Stier et al. | |
| 6,780,443 B1 | 8/2004 | Nakatsu et al. | |
| 6,783,783 B2 | 8/2004 | Clark et al. | |
| 2002/0122843 A1 | 9/2002 | McGrew et al. | |
| 2003/0072841 A1 | 4/2003 | Rajaiah et al. | |
| 2003/0072842 A1 | 4/2003 | Johnson et al. | |
| 2003/0198713 A1 | 10/2003 | Clark et al. | |
| 2004/0018954 A1 * | 1/2004 | Su et al. | ............ 512/1 |
| 2004/0175489 A1 | 9/2004 | Clark et al. | |
| 2004/0191402 A1 | 9/2004 | Stawski et al. | |
| 2004/0247743 A1 | 12/2004 | Wolf et al. | |
| 2004/0253189 A1 | 12/2004 | Maxwell et al. | |
| 2004/0253190 A1 | 12/2004 | Maxwell et al. | |
| 2004/0253191 A1 | 12/2004 | Maxwell et al. | |
| 2004/0253192 A1 | 12/2004 | Maxwell et al. | |
| 2005/0265930 A1 * | 12/2005 | Erman et al. | ............ 424/49 |
| 2007/0048424 A1 | 3/2007 | Moza et al. | |
| 2007/0059417 A1 | 3/2007 | Moza et al. | |

FOREIGN PATENT DOCUMENTS

| | | |
|---|---|---|
| WO | WO 93/23005 | 11/1993 |
| WO | WO 97/24036 A1 | 7/1997 |
| WO | WO 99/13734 | 3/1999 |

* cited by examiner

*Primary Examiner*—Frederick Krass
*Assistant Examiner*—Darryl C Sutton
(74) *Attorney, Agent, or Firm*—Brinks Hofer Gilson & Lione; Steven P. Shurtz

(57) ABSTRACT

A method of preparing a liquid flavoring composition includes combining menthol and at least one physiological cooling agent selected from the group consisting of N-substituted p-menthane carboxamides, acyclic carboxamides, menthyl succinate and combinations thereof. The menthol and the at least one physiological cooling agent are heated to form a liquid composition. The composition of the menthol and the at least one physiological cooling agent is cooled to about 25° C. while maintaining the composition in a liquid state to create the liquid flavoring composition.

31 Claims, No Drawings

US 7,767,243 B2

COMBINATIONS OF COOLING AGENTS FOR USE IN CONFECTIONS

RELATED APPLICATIONS

This application claims the benefit of U.S. Provisional Patent Application No. 60/640,141, filed Dec. 29, 2004, the entire disclosure of which is hereby incorporated herein by reference

BACKGROUND

The present invention relates to a flavoring composition. More particularly, it relates to a flavoring composition which includes menthol and one or more physiological cooling agents, and methods of preparing the flavoring composition.

Menthol has been added to consumer products for the purpose of flavoring and breath freshening for many years. Being a major constituent of peppermint oil, menthol has been used extensively in many consumer products, including mouthwash, confections, chewing gums, beverages, foods, dentifrices, and personal care products, such as shaving creams and lotions.

Several known compounds have what can be characterized as a "cooling" activity, and are referred to in the art as "physiological cooling agents." Physiological cooling agents are perceived as cold or cool when contacted with the human body and, in particular, with the mucous membranes of the mouth, nose and throat. Menthol in combination with one or more physiological cooling agents provides optimal cooling without unwanted flavor characteristics.

Menthol has a melting point of 43° C. Once melted, menthol will quickly solidify and recrystallize upon cooling. For this reason, menthol is typically dissolved in solvents, such as liquid flavors, before addition to the other ingredients in the product batches to allow homogenous incorporation. Many physiological cooling agents are solid materials at room temperature and, once melted, will quickly solidify and recrystallize upon cooling.

The crystalline materials such as menthol and physiological cooling agents are difficult to work with in consumer products due to their intense flavor and cooling, requiring them to be evenly incorporated and distributed throughout the finished product to give acceptable sensory profiles, particularly flavor profiles. Since menthol and many physiological cooling agents are solid at room temperature, they can be added to formula batches by first dissolving them in liquid flavor or solvent ingredients. But, not all consumer product formulas contain enough liquid flavors, or other solvent, to dissolve the quantity of menthol and/or physiological cooling agents needed to achieve the flavor intensity wanted. Moreover, manufacturing flexibility may make it desirable to combine the flavor with differing levels of the cooling agents for different products.

Solid menthol and physiological cooling agents can be added to consumer products as a ground mixture. However, this will usually lead to finished product defects including uneven flavor and cooling, rough or gritty texture and appearance, and uneven coloring and cloudiness. Therefore, it would be useful to have a composition including menthol and physiological cooling agents which is liquid at room temperature, without adding any additional solvent or flavoring.

BRIEF SUMMARY

It has been discovered that a mixture of menthol and one or more physiological cooling agents can be melted and cooled to form a liquid composition that is stable for a period of time at a temperature lower than the melting temperatures of the individual components. This allows the use of a liquid flavoring composition at room temperature which comprises menthol and one or more physiological cooling agents.

In one aspect, a method of preparing a liquid flavoring composition includes combining menthol and at least one physiological cooling agent selected from the group consisting of N-substituted p-menthane carboxamides, acyclic carboxamides, menthyl succinate and combinations thereof. The menthol and the at least one physiological cooling agent are heated to form a liquid composition. The composition of the menthol and the at least one physiological cooling agent is cooled to less than about 30° C. while maintaining the composition in a liquid state to create the liquid flavoring composition. In one embodiment, the liquid flavoring composition comprises about 25% to about 75% by weight menthol and about 25% to about 75% by weight of the at least one physiological cooling agent.

In another aspect, a method of preparing a flavoring composition includes combining menthol and at least one physiological cooling agent selected from the group consisting of n-ethyl-p-menthane-3-carboxamide, 2-isopropyl-N,2,3-trimethyl butanamide, and combinations thereof. The menthol and the at least one physiological cooling agent are heated to a temperature of at least about 65° C. The mixture of the menthol and the at least one physiological cooling agent are cooled to about 25° C. to create a liquid flavoring composition. The flavoring composition comprises about 25% to about 75% by weight menthol and about 25% to about 75% by weight of the at least one physiological cooling agent.

In another aspect, a flavoring composition which is liquid at 25° C. is provided. The flavoring composition consists essentially of about 25% to about 75% by weight menthol and about 25% to about 75% by weight of at least one physiological cooling agent selected from the group consisting of N-substituted p-menthane carboxamides, acyclic carboxamides, menthyl succinate and combinations thereof. In one aspect, the flavoring composition maintains a liquid form at 25° C. for a period of at least about 90 minutes without additional solvent.

The liquid, non-crystallizing cooling composition disclosed herein creates a means of introducing menthol and physiological cooling agents into a consumer product without the difficulties of incorporating crystalline flavoring into the product when sufficient liquid flavor or solvent volume are not available to dissolve them, or when processing limitations require liquid flavor ingredients to be added separately from the menthol and/or cooling agents.

The foregoing and other features and advantages of the present invention will become apparent from the following detailed description of the presently preferred embodiments, when read in conjunction with the accompanying examples.

DETAILED DESCRIPTION OF THE PRESENTLY PREFERRED EMBODIMENTS

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

In the context of this invention, a comestible refers to any product that may used in the mouth, including food, confections, mouth wash, dentifrices, and the like. Confections include both chewing gum and all types of candy. Chewing gum refers to chewing gum, bubble gum and the like. Moreover, all percentages herein are based on weight percentages unless otherwise specified. Further, although some terms are referred to in the singular, it is understood that such references may also encompass the plural. For example, although chewing gum coating is referred to in the singular, it is understood that coated chewing gum normally contains multiple layers of coating.

Menthol may be added to consumer products for flavoring and breath freshening. To enhance the menthol flavor and cooling perceived in a consumer product, numerous physiological cooling agents can be added along with the menthol. Preferred physiological cooling agents do not have a perceptible flavor of their own, but simply provide a cooling effect.

Physiological cooling agents include menthyl succinate, acyclic carboxamides, menthyl lactate, N-substituted p-menthane carboxamides, and mixtures thereof. Two particularly useful cooling agents are WS-3 [n-ethyl-p-menthane-3-carboxamide] and WS-23 [2-isopropyl-N,2,3-trimethyl butanamide]. Substituted p-menthane carboxamides, especially N-ethyl-p-menthane-3-carboxamide (WS-3) are disclosed in U.S. Pat. Nos. 4,060,091; 4,190,643 and 4,136,163, all assigned to Wilkinson Sword. Acyclic carboxamides, especially N-2,3-trimethyl-2-isopropyl butanamide (WS-23), are disclosed in U.S. Pat. Nos. 4,296,255; 4,230,688; and 4,153,679; all assigned to Wilkinson Sword. Another N-substituted p-menthane carboxamide is N-tert-Butyl-p-menthane-3-carboxamide, known as WS-14.

The concentration of physiological cooling agent in a product will depend on the intensity of the physiological cooling agent and the desired cooling effect. In general the concentration of physiological cooling agents used is between about 0.001% and about 2% by weight of the product. The preferred concentration of physiological cooling agent is between about 0.01% and about 1.0%, more preferably between 0.02% and about 0.5%.

The preferred physiological coolant agents of this invention are WS-3 and/or WS-23 combined with menthol. WS-3 and WS-23 are individual coolants with their own physical properties and sensory attributes. WS-3 is a p-menthane carboxamide based on menthol. WS-23 is an acyclic carboxamide based on menthol with an open ring. Their physical properties are different as well as their sensory attributes. Menthol, WS-3, and WS-23 give different types of cooling in different areas of the mouth. Menthol gives an airy, aromatic, nasal, vapor action type cooling, whereas the other two give an odorless type cooling in the front or back of the throat. To give a more complete cooling sensation, a combination of all three coolants may be used in products.

Menthol, WS-3, and WS-23 are solid materials at room temperature and, once melted, will quickly solidify and recrystallize upon cooling. Other cooling agents such as menthyl lactate, menthyl succinate, and other WS compounds (such as WS-14) may also be used. Although many coolants are liquids and can be easily dispersed in products, these coolants are solid materials and need to be dissolved in a solvent or other flavors to properly admix them to various types of food products. Table 1 shows the melting temperatures of these physiological coolants.

TABLE 1

| Cooling agent | Melting temperature |
| --- | --- |
| Menthyl Lactate | 40-42° C. |
| Menthyl Succinate | 59-61° C. |
| WS-3 | 88° C. |
| WS-14 | 148° C. |
| WS-23 | 62-64° C. |

A mixture of menthol and one or more physiological cooling agents can be melted and cooled to form a liquid composition that is stable for a period of time at room temperature. This allows the use of a liquid flavoring composition at room temperature which comprises menthol and one or more physiological cooling agents.

The method of preparing the liquid flavoring composition includes combining menthol and at least one physiological cooling agent selected from the group consisting of N-substituted p-menthane carboxamides, acyclic carboxamides, menthyl succinate and combinations thereof. The menthol and the at least one physiological cooling agent are heated to form a liquid composition. The composition of the menthol and the at least one physiological cooling agent is cooled to less than about 30° C. while maintaining the composition in a liquid state to create the liquid flavoring composition. In one embodiment, the composition of the menthol and the at least one physiological cooling agent is cooled to about 25° C. while maintaining the composition in a liquid state to create the liquid flavoring composition.

In one embodiment, the liquid flavoring composition comprises about 25% to about 75% by weight menthol and about 25% to about 75% by weight of the at least one physiological cooling agent. In particular embodiments, the flavoring composition includes about 25% to about 75% by weight menthol and about 25% to about 75% by weight WS-3; about 25% to about 75% by weight menthol and about 25% to about 75% by weight WS-23; and about 25% to about 75% by weight menthol and about 25% to about 75% by weight a mixture of WS-3 and WS-23.

The menthol and the at least one physiological cooling agent are heated to a temperature sufficient to melt the menthol and the physiological cooling agent. In one embodiment, the menthol and the at least one physiological cooling agent are heated to a temperature of at least about 65° C. The heating of the menthol and the physiological cooling agent melts the menthol and the physiological cooling agent. While not intending to be bound by theory, it is believed that the lower-melting point component(s) melt first and then help to dissolve the higher-melting point component(s). The heated components may be mixed by any suitable method, and may be mixed before or after melting.

After cooling to around room temperature, the liquid flavoring composition maintains a stable liquid form. The liquid flavoring composition maintains a liquid form at 25° C. for a period of at least about 90 minutes, preferably at least about 24 hours, more preferably at least about 4 days, and most preferably at least about 30 days.

The present invention also provides a flavoring composition which is liquid at 25° C., comprising about 25% to about 75% by weight menthol and about 25% to about 75% by weight of at least one physiological cooling agent selected from the group consisting of N-substituted p-menthane carboxamides, acyclic carboxamides, menthyl succinate and combinations thereof. Preferably, the physiological cooling agent is selected from the group consisting of N-ethyl-p-menthane-3-carboxamide (WS-3), 2-isopropyl-N,2,3-trimethyl butanamide (WS-23), and combinations thereof. The physiological cooling agent can be 100% WS-3, 100% WS-23, or a combination of the two physiological cooling agents in any amount. In one embodiment, at least about 75% of the flavoring composition is the menthol and the at least one physiological cooling agent. In one embodiment, the flavoring composition contains no additional flavoring or solvent. In another embodiment, the flavoring composition comprises less than about 25% by weight of any additional flavoring or solvent.

The invention also provides a method of making a flavored product which includes preparing the liquid flavoring composition as described above and incorporating the liquid flavoring composition into a comestible. In one embodiment, the liquid flavoring composition is incorporated into a coating for a comestible. The comestible may be a food product, or a confection such as chewing gum or candy. In one embodiment, a confection includes the flavoring composition at about 0.1% to about 2% by weight. In a further embodiment, the chewing gum includes the flavoring composition at about 0.1% to about 2% by weight. Methods of incorporating physiological cooling agents into various confections are disclosed in U.S. Pat. No. 6,627,233 (chewing gum); U.S. Pat. No. 6,783,783 (a confectionary tablet product); and U.S. Published Application 2004/0191402 (hard candy), the contents of all of which are hereby incorporated by reference.

U.S. Pat. No. 6,627,233 to Wolf et al. discloses the use of menthol and physiological cooling agents in chewing gum. The physiological cooling agents disclosed include menthyl succinate; acyclic carboxamides; menthyl lactate; 3-1-menthoxypropane-1,2-diol; N-substituted p-menthane carboxamides; and menthone glycerol ketals. The menthol and physiological cooling agents are preferably added with a flavor addition. The menthol and physiological cooling agents may also be added to the syrup used to make a coating for the gum, or applied to the gum center. Using the flavoring composition of the present invention, the menthol and physiological cooling agents could be added to the gum separately from the other flavoring ingredients.

U.S. Pat. No. 6,783,783 to Clark et al. discloses a confectionary tablet product containing a physiological cooling agent. Exemplary cooling agents include substituted p-menthane carboxamides, acyclic carboxamides, menthone glycerol ketals, menthyl lactate, menthyl succinate, and 3-1-menthoxypropane-1,2 diol. The cooling agents are preferably preblended with the flavor before being added to the mixture of ingredients used to form the tablet. Menthol may be preblended with the flavor or may be added to the tablet composition mixture in its crystalline form. The liquid flavoring composition of the present invention allows for the addition of high levels of menthol and physiological cooling agents without increasing the product's moisture or solvent levels. The liquid flavoring composition also allows the menthol and physiological cooling agents to be added to the tablet separately from the other flavoring ingredients.

U.S. Published Application 2004/0191402 to Stawski at al. discloses the use of physiological cooling agents in hard candy. Typical cooling agents include substituted p-menthane carboxamides, acyclic carboxamides, menthone glycerol ketals, menthyl lactate, menthyl succinate, menthyl glutarate, 3-1-menthoxypropane-1,2 diol, 1-isopulegol, p-menthane-3, 8-diol and mixtures thereof. Menthol and physiological cooling agents are added at least to the jacket material of the candy. These cooling agents may be preblended with the flavor before being added to the mixture of ingredients used to form the hard candy. Menthol may be preblended with the flavor or may be added to the hard candy composition in its crystalline form. The core and the outer layer of the candy may have different levels of cooling agents. Using the flavoring composition of the present invention, the menthol and physiological cooling agents could be added as a uniform surface coating due to its liquid form, without the need for additional liquid flavors or solvents.

The present invention provides a method of incorporation that increases the flexibility of batch processing by separating the liquid menthol and physiological cooling composition from the other liquid flavors in the production of consumer products. The liquid cooling composition can be made and stored until it is needed for production. A master batch of the liquid cooling composition could be made and pulled from for different finished consumer products which each contain different flavoring components. This is particularly of interest to manufacturers producing smaller batches and/or producing a wide variety of finished product formulas.

In one embodiment, the liquid flavoring composition is used in coated pellet products. When making coated pellet products, liquid flavor is often added to the pellets as they tumble as a mass in a rotating pan. Adding flavors in liquid form allows uniform addition and pellet coating. Addition of flavors as crystalline powder will not uniformly adhere to the pellets, leading to uneven flavor addition to the pellets. If melted coolants were added, the cool pellets and cool air used to dry coatings would cause rapid crystallization and not allow the coolant to evenly cover the surface of the products. Additionally, as air is blown onto or through the mass of pellets as they tumble, dry flavor powder will be lost through the exhaust of the blowing air. The composition of the present invention allows for the addition of menthol and physiological cooling agents to the pellets as a uniform surface coating due to its liquid form, without the need for additional liquid flavors or solvents.

In one embodiment, the liquid flavoring composition is used in molten glass confections. When making molten glass confections, components such as sugars or sugar alcohols are heated into a molten mass and moisture is reduced to less than 3%. The lower the moisture content, the more stable the cooled confection. The invention allows for the addition of menthol and physiological cooling agents to the molten glass with uniform distribution without the need for additional liquids. Additional liquids could add moisture to the molten glass or interfere with the glass stability, causing the glass to "cold flow." The liquid flavoring composition as disclosed herein allows the menthol and physiological cooling agents to be added to the molten glass as the product cools, allowing for reduced evaporation and loss of menthol. In one embodiment, the flavoring composition comprises less than about 5% by weight water, preferably less than about 3% by weight water.

In one embodiment, the liquid flavoring composition is used in pressed confection tablets. When making pressed confection tablets, components such as sugars and polyols are combined with flavoring compounds and binders and then compressed to the size and texture desired. Moisture and solvent content must be limited or capping or cracking can occur. The liquid flavoring composition allows for the addition of high levels of menthol and physiological cooling agents without increasing the product's moisture or solvent levels. Additionally, the liquid flavoring composition allows for the homogenous mixing of the menthol and physiological cooling agents with the other components without the stratification that could occur with dry addition of the menthol and physiological cooling agents to the other dry components. Dry addition of menthol and physiological cooling agents could also create visual defects through its particle size and uneven incorporation.

In one embodiment, the liquid flavoring composition is used in nutritional food bars. With nutritional food bars, excess moisture and solvents will create a sticky texture, which could be cause sticking to the packaging, create unacceptable visual appearance, and create unacceptable eating texture. The liquid flavoring composition allows for the uniform addition of menthol and physiological cooling agents to the food product without the addition of moisture or solvents.

Using the disclosed flavoring composition, solvents in quantities sufficient to dissolve the menthol and the physiological cooling agents are not necessary to give consumer products even flavor profiles throughout production batches and individual product units. The liquid flavoring composition disclosed herein, unlike solid flavoring additives, will not interfere with consumer product texture through grittiness, and will not interfere with consumer product appearance through product visual heterogeneity and opacity.

EXAMPLES

In Examples 1-16, menthol, WS-3, and/or WS-23 were dry mixed, heated in an oven at 65-70° C., and the mixture gently stirred after melting began. A temperature of 65-70° C. was sufficient to melt all the formulations shown in Examples 1-16. Samples were then stored at room temperature (22-25° C.) and observed for hardening and crystallizing.

TABLE 2

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| Menthol | 50 | 50 | 75 | 70 | 30 | 30 | 75 | 70 |
| WS-3 | 0 | 50 | 0 | 15 | 0 | 35 | 25 | 30 |
| WS-23 | 50 | 0 | 25 | 15 | 70 | 35 | 0 | 0 |
| Time to harden | >4 days | >4 days | >4 days | >4 days | 24 hrs | >4 days | <90 min | 24 hrs |

TABLE 3

|  | Ex. 9 | Ex. 10 | Ex. 11 | Ex. 12 | Ex. 13 | Ex. 14 | Ex. 15 | Ex. 16 |
|---|---|---|---|---|---|---|---|---|
| Menthol | 90 | 95 | 95 | 90 | 30 | 20 | 20 | 70 |
| WS-3 | 10 | 0 | 5 | 0 | 70 | 0 | 80 | 0 |
| WS-23 | 0 | 5 | 0 | 10 | 0 | 80 | 0 | 30 |
| Time to harden | <90 min | <90 min | <90 min | <90 min | 90 min | >2 hrs | <2 hrs | >4 days |

From Tables 2 and 3, it can be seen that the compositions in Examples 1-4, 6 and 16 remained liquid and non-crystallizing for at least 4 days. The compositions in Examples 9-12 and 15 solidified and crystallized in less than 24 hours, often in less then 90 minutes. Results indicate that the menthol percentage for the greatest stability against crystallization was about 25% to about 75% menthol. A stability time of at least 90 minutes is preferred.

In Examples 17 and 18, shown in Table 4, the combination of menthol and physiological cooling agents can be first melted together and then added to the gum batch without the need for the menthol or cooling agents to be first dissolved in a flavor or solvent ingredient. This allows flexibility in formulation, as a formula may not contain enough liquid flavor or solvent to dissolve the formula quantities of menthol and cooling agents. In other situations, the manufacturer may want to add the liquid flavors and the combined coolants at separate stages of the gum production.

TABLE 4

Chewing Gum with Menthol and Cooling Agents

|  | Example 17 | Example 18 |
|---|---|---|
| Sorbitol | 48.60 | 49.60 |
| Base | 25.00 | 25.00 |
| Glycerin | 11.40 | 11.40 |
| Coevaporated Glycerin/Lycasin* | 7.67 | 7.67 |
| Maltitol | 5.00 | 5.00 |
| Spearmint Flavor | 1.09 | 0.78 |
| Liquid flavoring composition** | 0.46 | 0.76 |
| Lecithin | 0.30 | 0.30 |
| Encapsulated Sweeteners | 0.34 | 0.34 |
| Salt Solution*** | 0.10 | 0.10 |
| Color | 0.04 | 0.04 |
| Total | 100.00 | 100.00 |

*Contains 25% glycerin, 67.5% Lycasin brand hydrogenated starch hydrolysate solids and 7.5% water
**Contains 44% menthol and 56% WS-23 in Example 17 and 50% menthol and 50% WS-23 in Example 18.
***Contains 10% NaCl and 90% water In Example 17, a 44:56 ratio of menthol: WS-23 can be melted and added to the gum separately from the Spearmint flavor. In Example 18, a 50:50 ratio of menthol: WS-23 can be melted and added separately to the gum formulation. Both products would have good coolness with an even distribution of cooling.

Examples 19-21 show the use of the combination of menthol and coolants in a gum center and gum coating.

TABLE 5

|  | Example 19 Center |
|---|---|
| Sorbitol | 39.5% |
| Base | 32.0% |

TABLE 5-continued

|  | Example 19 Center |
|---|---|
| Calcium Carbonate | 15.0% |
| 70% Liquid Sorbitol | 7.5% |
| Encapsulated Menthol | 2.2% |
| Eucalyptus flavor | 0.8% |
| Glycerin | 0.9% |
| Encapsulated sweeteners | 0.9% |
| Liquid flavoring composition* | 1.2% |
| Total | 100.0% |

*Contains 75% menthol and 25% WS-23

TABLE 6

|  | Example 20 Coating | Example 21 Coating |
| --- | --- | --- |
| Isomalt | 90.5% | 90.3% |
| Gum Arabic | 5.5% | 5.5% |
| Titanium Dioxide | 1.0% | 1.0% |
| Eucalyptus flavor | 0.8% | 0.1% |
| Intense Sweetener | 0.5% | 0.8% |
| Color | 0.1% | 0.1% |
| Polishing Agents | 0.2% | 0.2% |
| Liquid flavoring composition* | 1.4% | 2.0% |
| Total | 100.0% | 100.0% |

*Contains 71% menthol and 29% WS-23 in Example 20 and 75% menthol and 25% WS-23 in Example 21

The gum center of Example 19 can be coated with the coating of Example 20 to give a 33% coated product (⅓ coating:⅔ center) with a eucalyptus/menthol type flavor with good cooling. The eucalyptus flavor can be applied in two coating applications of the coating syrup and the menthol/WS-23 mixture (1.0/0.4) can be applied at two other coating syrup applications to give a menthol/eucalyptus type product with good cooling.

The gum center of Example 19 can also be coated as in Example 21 to give a 33% coated product with a menthol type flavor with good cooling. The eucalyptus flavor can be applied in one coating application of the coating syrup and the menthol/WS-23 mixture (1.5/0.5) can be applied in three applications of the coating syrup. This will give a mentholated-type chewing gum product with good cooling and menthol taste.

Example 22

A eucalyptus/menthol hard candy can be made with good cooling using the formulation of Table 7 and the process described below.

TABLE 7

|  | Example 22 |
| --- | --- |
| Isomalt | 97.68% |
| Xylitol | 1.00 |
| Acesulfame K | 0.05% |
| Aspartame | 0.10% |
| Flavor | 0.80% |
| Liquid flavoring composition* | 0.35% |
| Color | 0.02% |
| Total | 100.0% |

*Contains 71% menthol and 29% WS-23

Isomalt, xylitol, and acesulfame K are mixed in water and cooked until the cooked syrup reaches a moisture level of about 1-2%, forming a thick syrup. The thick syrup is poured on a stainless steel cooling table and allowed to cool. Aspartame, eucalyptus flavor, color, and the melted blend of menthol and WS-23 are then added and mixed by kneading. The mix is cooled to room temperature and cut as needed.

Example 23

A peppermint compressed mint tablet with strong menthol/cooling can be made using the formulation of Table 8 and the process described below.

TABLE 8

|  | Example 23 |
| --- | --- |
| Sorbitol | 98.7% |
| Aspartame | 0.1% |
| Magnesium Stearate | 1.0% |
| Flavor | 0.1% |
| Liquid flavoring composition* | 0.1% |
|  | 100.0% |

*Contains 50% menthol and 50% WS-23

The ingredients are weighed in suitable containers. Sorbitol is placed in a mixing bowl and flavor, sweetener, and a liquid blend of menthol and WS-23 are added. The components are mixed for 3 minutes. The magnesium stearate is added and mixed for 3 minutes. Tableting is started and size, weight, and hardness are adjusted.

Example 24

A peppermint, sugarless gum drop with strong menthol cooling can be made using the formulation of Table 9 and the process described below.

TABLE 9

|  | Example 24 |
| --- | --- |
| Gelatin, 200 Bloom type B | 7.0% |
| Crystalline sorbitol | 68.6% |
| Hot water (80°-90° C.) | 14.0% |
| Water | 10.0% |
| Flavor | 0.2% |
| Liquid flavoring composition* | 0.10% |
| Color | 0.10% |
| Total | 100.0% |

*Contains 50% menthol and 50% WS-23

Gelatin is dissolved directly in hot water. The sorbitol and water are cooked at 115° C. and the gelatin solution added. The mixture is stirred slowly in order to obtain a smooth homogeneous mixture. Air bubbles are removed with de-aeration equipment or other available means. Color, flavor, and melted mixture of menthol and WS-23 are added. The mixture is deposited into cool and dry starch trays, and some starch sprinkled onto articles. The temperature at depositing is 70° C., and the total solids when depositing is 78 Brix. The starch trays are then stored at room temperature for 24 hours.

It should be appreciated that the methods and compositions of the present invention are capable of being incorporated in the form of a variety of embodiments, only a few of which have been illustrated and described above. The invention may be embodied in other forms without departing from its spirit or essential characteristics. It will be appreciated that the addition of some other ingredients, process steps, materials or components not specifically included will have an adverse impact on the present invention. The best mode of the invention may therefore exclude ingredients, process steps, materials or components other than those listed above for inclusion or use in the invention. However, the described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

What is claimed is:

1. A method of preparing a liquid flavoring composition comprising:
   a) combining menthol and at least one physiological cooling agent selected from the group consisting of N-substituted p-menthane carboxamides, acyclic carboxamides, menthyl succinate and combinations thereof;
   b) heating at least one of the menthol and the at least one physiological cooling agent and forming a liquid composition of the menthol and the at least one physiological cooling agent, wherein the combining and heating steps are performed in any order; and
   c) cooling the composition of the menthol and the at least one physiological cooling agent to less than about 30° C. while maintaining the composition in a liquid state to create the liquid flavoring composition,
   d) wherein the liquid flavoring composition comprises about 25% to about 75% by weight menthol and about 25% to about 75% by weight of the at least one physiological cooling agent; and said liquid flavoring composition is stable at a temperature lower than the individual melting temperatures of said menthol and cooling agent.

2. The method of claim 1 wherein the menthol and the physiological cooling agent are combined while each is in a melted state.

3. The method of claim 1 wherein the menthol and the at least one physiological cooling agent are heated to a temperature of at least about 65° C.

4. The method of claim 1 wherein the menthol and the physiological cooling agent are combined while each is in a solid state and the heating of the menthol and the physiological cooling agent melts the menthol and the physiological cooling agent together.

5. The method of claim 1 wherein the physiological cooling agent is selected from the group consisting of n-ethyl-p-menthane-3-carboxamide, 2-isopropyl-N,2,3-trimethyl butanamide, and combinations thereof.

6. The method of claim 1 wherein the liquid flavoring composition maintains a liquid form at 25° C. for a period of at least about 90 minutes.

7. The method of claim 1 wherein the liquid flavoring composition maintains a liquid form at 25° C. for a period of at least about 24 hours.

8. The method of claim 1 wherein the liquid flavoring composition maintains a liquid form at 25° C. for a period of at least about 4 days.

9. A method of making a flavored product comprising preparing the liquid flavoring composition according to claim 1 and incorporating the liquid flavoring composition into a comestible.

10. A confection made according to the method of claim 9.

11. A chewing gum made according to the method of claim 9.

12. A method of making a coated product comprising preparing the liquid flavoring composition according to claim 1 and incorporating the liquid flavoring composition into a coating for a comestible.

13. A method of preparing a flavoring composition comprising:
   a) combining menthol and at least one physiological cooling agent selected from the group consisting of n-ethyl-p-menthane-3-carboxamide, 2-isopropyl-N,2,3-trimethyl butanamide, and combinations thereof;
   b) heating at least one of the menthol and the at least one physiological cooling agent and forming a liquid mixture having a temperature of at least about 65° C., wherein the combining and heating steps are performed in any order; and
   c) cooling the mixture of the menthol and the at least one physiological cooling agent to about 25° C. to create a liquid flavoring composition, wherein the flavoring composition comprises about 25% to about 75% by weight menthol and about 25% to about 75% by weight of the at least one physiological cooling agent; and said liquid flavoring composition is stable at a temperature lower than the individual melting temperatures of said menthol and cooling agent.

14. The method of claim 13 wherein the flavoring composition maintains a liquid form at 25° C. for a period of at least about 90 minutes.

15. The method of claim 13 wherein the flavoring composition maintains a liquid form at 25° C. for a period of at least about 24 hours.

16. The method of claim 13 wherein the flavoring composition maintains a liquid form at 25° C. for a period of at least about 4 days.

17. A method of making a comestible comprising preparing the flavoring composition according to claim 13 and incorporating the flavoring composition into a comestible.

18. A flavoring composition which is liquid at 25° C., comprising:
   a) about 25% to about 75% by weight menthol;
   b) about 25% to about 75% by weight of at least one physiological cooling agent selected from the group consisting of N-substituted p-menthane carboxamides, acyclic carboxamides, menthyl succinate and combinations thereof; and
   c) at least about 75% by weight of the menthol and the at least one physiological cooling agent; and said liquid flavoring composition is stable at a temperature lower than the individual melting temperatures of said menthol and cooling agent.

19. The flavoring composition of claim 18 wherein the physiological cooling agent is selected from the group consisting of n-ethyl-p-menthane-3-carboxamide, 2-isopropyl-N,2,3-trimethyl butanamide, and combinations thereof.

20. The flavoring composition of claim 18 wherein the physiological cooling agent is n-ethyl-p-menthane-3-carboxamide.

21. The flavoring composition of claim 18 wherein the physiological cooling agent is 2-isopropyl-N,2,3-trimethyl butanamide.

22. The flavoring composition of claim 18 wherein the flavoring composition maintains a liquid form at 25° C. for a period of at least about 90 minutes without additional solvent.

23. The flavoring composition of claim 18 comprising less than about 3% by weight water.

24. A confection including the flavoring composition of claim 18.

25. A chewing gum including the flavoring composition of claim 18.

26. A flavoring composition which is liquid at 25° C. consisting essentially of:
   a) about 25% to about 75% by weight menthol; and
   b) about 25% to about 75% by weight of at least one physiological cooling agent selected from the group consisting of N-ethyl-p-menthane-3-carboxamide, 2-isopropyl-N,2,3-trimethyl butanamide, and combinations thereof; and said liquid flavoring composition is stable at a temperature lower than the individual melting temperatures of said menthol and said cooling agent.

27. The flavoring composition of claim 26 wherein the flavoring composition maintains a liquid form at 25° C. for a period of at least about 90 minutes.

28. The flavoring composition of claim 26 wherein the flavoring composition maintains a liquid form at 25° C. for a period of at least about 24 hours.

29. The flavoring composition of claim 26 wherein the flavoring composition maintains a liquid form at 25° C. for a period of at least about 4 days.

30. A confection including the flavoring composition of claim 26 at about 0.1% to about 2% by weight.

31. A chewing gum including the flavoring composition of claim 26 at about 0.1% to about 2% by weight.

* * * * *

UNITED STATES PATENT AND TRADEMARK OFFICE
CERTIFICATE OF CORRECTION

PATENT NO. : 7,767,243 B2  
APPLICATION NO. : 11/316610  
DATED : August 3, 2010  
INVENTOR(S) : David L. Witkewitz et al.

Page 1 of 1

It is certified that error appears in the above-identified patent and that said Letters Patent is hereby corrected as shown below:

On the Title Page

Left column, item (73), replace "WH. Wrigley Jr." with --Wm. Wrigley Jr.--.

Signed and Sealed this
Twelfth Day of March, 2013

Teresa Stanek Rea
*Acting Director of the United States Patent and Trademark Office*